Aug. 26, 1969   F. RENAUDIN   3,462,804
FASTENING CLAMP
Filed April 30, 1968   2 Sheets-Sheet 1
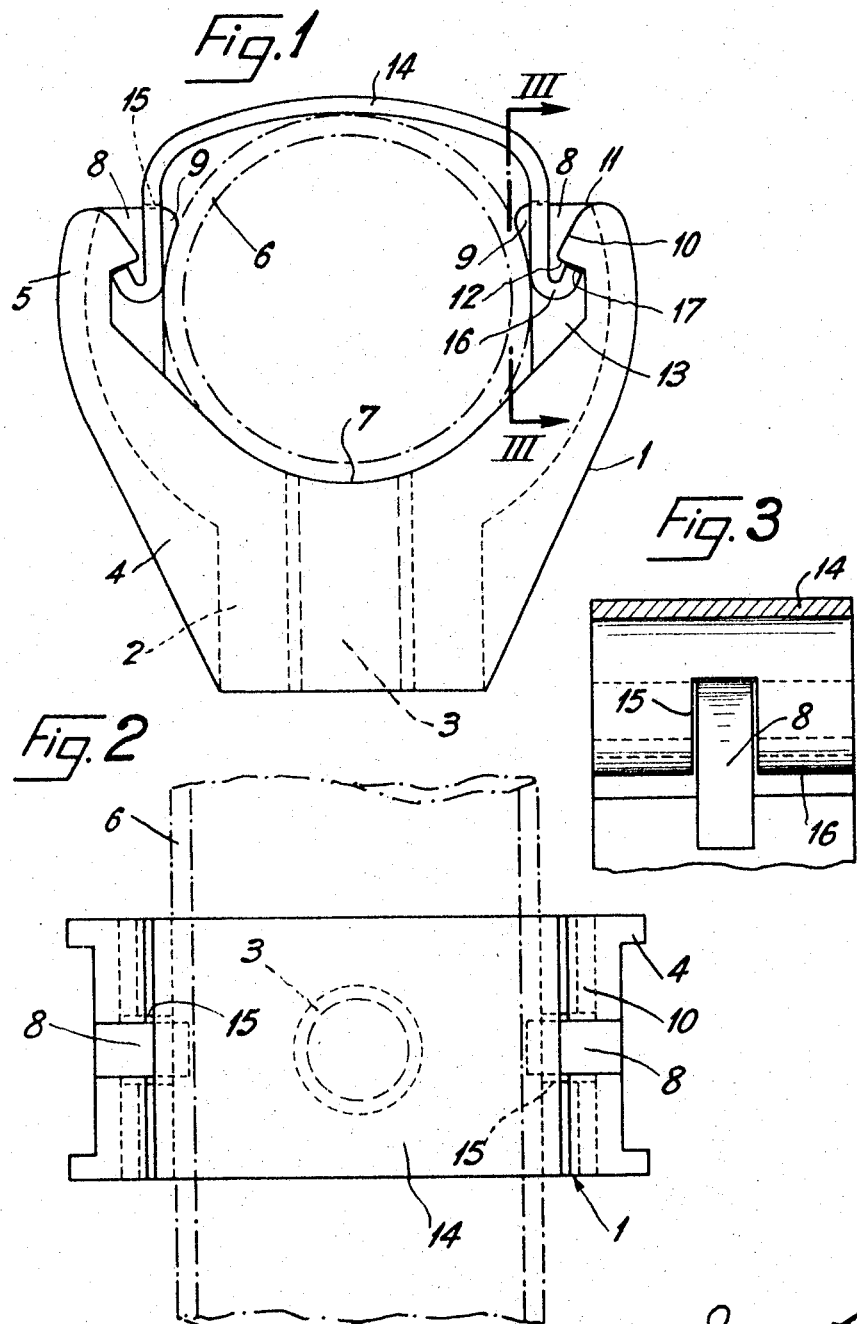

Aug. 26, 1969  F. RENAUDIN  3,462,804
FASTENING CLAMP
Filed April 30, 1968  2 Sheets-Sheet 2
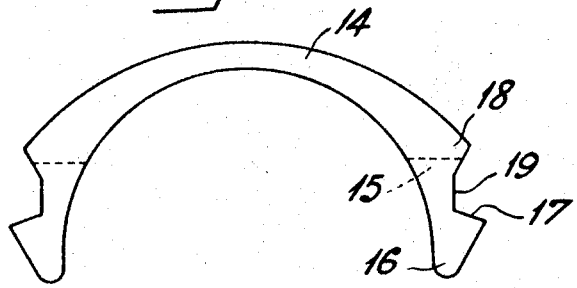
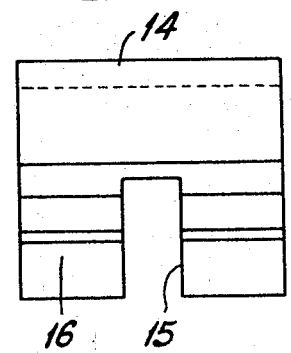
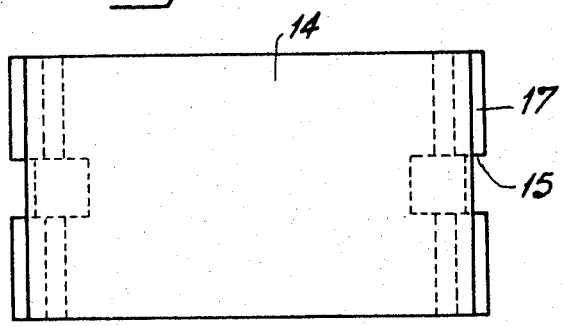

United States Patent Office 3,462,804
Patented Aug. 26, 1969

3,462,804
FASTENING CLAMP
Fernand Renaudin, Gray, Haute-Saone, France, assignor to Societe Industrielle du Metal Usine, Arc-les-Gray, Haute-Saone, France, a French body corporate
Filed Apr. 30, 1968, Ser. No. 725,409
Claims priority, application France, May 26, 1967, 107,981
Int. Cl. A44b 21/00
U.S. Cl. 24—257                                    9 Claims

ABSTRACT OF THE DISCLOSURE

A fastening clamp for a tube, pipe or other similar elongated object, of the kind comprising a resilient gripping means intended to grip the tube round more than one half of its periphery and a locking arch capable of being fitted on the gripping means, is characterised in that the resilient gripping means has, at the end of each of its branches, a median rib flanked by two oblique, inwardly-directed ramps terminating in bearing surfaces for the arch, and in that the arch terminates in forked ends, the fingers of these forked ends having outwardly-directed portions provided with bearing surfaces intended to enter into hooking engagement with the bearing surfaces of the gripping means.

---

This invention relates to the clamping of tubes, pipes or other objects of similar elongated shape. For the sake of simplicity in the ensuing description tubes, pipes or other objects of similar elongated shape will be referred to as tubes.

For the clamping of tubes it is known to employ fastening clamps of the kind comprising essentially a resilient gripping means intended to grip the tube round more than one half of its periphery. This gripping means advantageously may be completed by an arch which can be fitted thereto so as to lock the tube in the clamp.

The present invention has for its object improvements in clamps of the above described kind and, more particularly, to clamps of this kind which comprise a locking arch.

According to the present invention, the resilient gripping means has, at the end of each of its branches, a median rib flanked by two oblique, inwardly-directed ramps terminating in bearing surfaces for the arch, and the arch terminates in forked ends, the fingers of these forked ends having outwardly-directed portions provided with bearing surfaces intended to enter into hooking engagement with the bearing surfaces of the gripping means.

In order to fit the arch on the gripping means, it is only necessary to place the arch on the gripping means so that the fingers of its forked ends are disposed on the ramps of the branches of the gripping means, one on each side of said median ribs, and then to press on the ends of the arch, preferably first on one side and then on the other, until mutual engagement of the respective bearing surfaces is obtained.

During this fitting, the arch is guided by the ribs of the gripping means, which facilitates its positioning and ensures its maintenance in the correct position.

In addition, the length of the finger of the forked ends preferably is such that the bottom of the fork comes into contact with the rib or, at least, is situated very close to the latter, when the bearing surfaces of the fingers are engaged with those of the gripping means. In this way, it is avoided that the arch enters too far at one side of the gripping means, which makes it difficult to engage at the other side.

The invention will now be described in greater detail, by way of example, with reference to the accompanying drawings, in which:

FIGURE 1 is an end view of an improved fastening clamp according to the present invention,
FIGURE 2 is a corresponding plan,
FIGURE 3 is a partial sectional view taken on the line III—III of FIGURE 1,
FIGURE 4 is an end view of a modified arch made from moulded material, and
FIGURES 5 and 6 are respectively a plan and a view from the left of the arch of FIGURE 4.

In the embodiment shown in FIGURES 1 to 3, the fastening clamp includes a resilient gripping means 1 provided with a base 2 enabling its fixing to a support, by means, for example, of a screw-threaded hole 3.

The gripping means may be made of synthetic moulded plastics material (for example a polyamide or a polyester); its end faces are provided with reinforcing flanges 4.

The branches 5 of the gripping means are sufficiently long to grip a tube 6 round more than one half of its periphery, as shown in FIGURE 1.

The tube comes to rest on the rounded bottom 7 of the gripping means between two internal ribs 8 provided in the middle of each branch 5. The ribs 8 have a substantially rectangular section, as shown in FIGURE 2, and they each terminate in a rounded, inwardly-directed lip 9. The tube must separate these lips in order to fit into the gripping means. The resilience of the material of the gripping means permits quite larger tolerances in the tube diameter.

On its internal face, each of the branches 5 of the gripping means is provided, on both sides of the rib 8, with an oblique ramp 10, these ramps being directed towards the bottom of the gripping means and set back with respect to the rib 8. Each of these ramps commences with a rounded part 11 and ends in a bearing surface 12 obtained by forming a suitable recess 13 in the branch 5. The bearing surfaces 12 of each branch 5 lie in an obliquely disposed plane which intersects an imaginary line joining the free ends of the two branches 5.

Various types of arch 14 may be used with the gripping means which has been described.

In FIGURES 1 and 3, the arch 14 is thin and it may be made from a band of resilient material such as a spring metal, conveniently cut and folded. It has the shape of a U with a slightly rounded bottom, the radius of curvature of which is greater than that of the tube 6 to be fixed. The branches of the U each have at their end a median notch 15 (FIGURE 3) of rectangular shape, which notch is a little wider than the ribs 8 of the gripping means.

The notches 15 result in the formation of a fork at the end of each branch of the arch, the fingers 16 of these forks being folded obliquely outward, as can be seen from FIGURE 1, so as to obtain bearing surfaces 17 intended to enter into hooking engagement with the similar bearing surfaces 12 of the gripping means 1. The bearing surfaces 17 are preferably inclined at about the same angle and in the same direction as the bearing surfaces 12 so as to permit a large fitting tolerance of the clamp to the tubes to be fixed. This fitting tolerance is further increased by the flexibility and the slight curvature of the back of the arch which brings its central part to bear on the tube to be fixed and can be bent to permit the mutual engagement of the bearing surfaces.

The length of the fingers 16 is such that, when the bearing surfaces 12, 17 are in engagement, the bottom of each notch 15 will be situated a small distance from the external edge of the adjacent rib 8 or even touches this edge. As a result of this, when the corresponding end of the arch is pressed, the latter does not enter too far into the gripping means, which would make it difficult to achieve hooking engagement of the bearing surfaces at the opposite end of the arch.

The width of the opening of the arch may be such that when the clamp is closed, the ends of the fingers 16 bear on the tube to be fixed, as shown in FIGURE 1, which increases the locking effect.

The arch shown in FIGURES 4 to 6 has the same essential features as that which has just been described. It will be seen that it has a notch 15, defining the fingers 16, the latter being formed with suitable recesses 19 to provide the obliquely disposed bearing surfaces 17.

The arch may be made from synthetic moulded plastics material, for example the same material as that employed for manufacturing the gripping means. The arch springers 18 are reinforced.

What is claimed is:

1. A fastening clamp for a tube, as hereinbefore defined, comprising a resilient gripping means intended to grip the tube round more than one half of its periphery and a locking arch capable of being fitted on the gripping means, characterised in that the resilient gripping means has, at the end of each of its branches, a median rib flanked by two oblique, inwardly-directed ramps terminating in bearing surfaces for the arch, and in that the arch terminates in forked ends, the fingers of these forked ends having outwardly-directed portions provided with bearing surfaces intended to enter into hooking engagement with the bearing surfaces of the gripping means.

2. A clamp according to claim 1, in which the length of the fingers of the forked ends of the arch is such that the bottom of each fork will be situated at a small distance from the outer edge of the adjacent rib when the bearing surfaces of the fingers are engaged with those of the gripping means.

3. A clamp according to claim 1, in which the bearing surfaces of each branch of the gripping means lie in an obliquely disposed plane which intersects an imaginary line joining the free ends of said branches.

4. A clamp according to claim 3, in which the bearing surfaces of the arch have an obliquity substantially equal to that of the bearing surfaces of the gripping means.

5. A clamp according to claim 1, in which the opening of the arch is such that when its bearing surfaces are engaged with those of the gripping means the end of its fingers bear on the tube to be fixed.

6. A clamp according to claim 1, in which the radius of curvature of the median portion of the arch is greater than that of the tube to be fixed so that the ends of the said arch can bend resiliently.

7. A clamp according to claim 1, in which the arch is formed by folding a band of resilient material, for example spring metal.

8. A clamp according to claim 7, in which the arch has the form of a U with a slightly rounded bottom, its bearing surfaces being obtained by folding the ends of the fingers outwardly.

9. A clamp according to claim 1, in which the arch springers are reinforced.

References Cited

FOREIGN PATENTS

| 240,649 | 10/1925 | Great Britain. |
| 1,078,193 | 8/1967 | Great Britain. |
| 1,477,777 | 3/1967 | France. |

DONALD A. GRIFFIN, Primary Examiner

U.S. Cl. X.R.

248—74